Aug. 24, 1965  H. RAPPOLD ETAL  3,202,171
WELDED SLIDE VALVE CASING WITH SEALING FACE SUPPORTING MEANS
Filed June 1, 1962
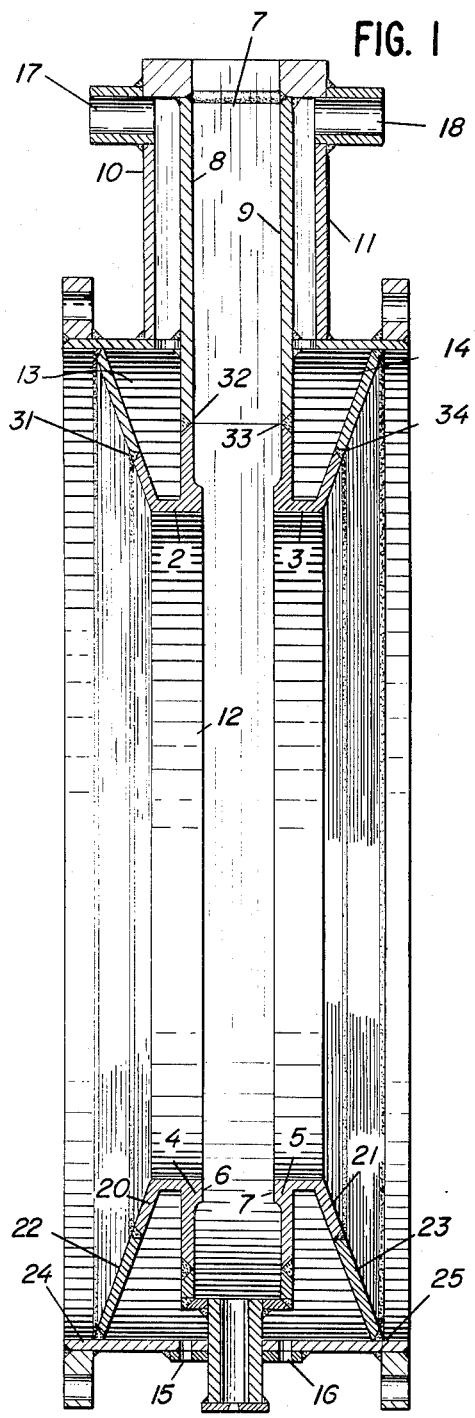
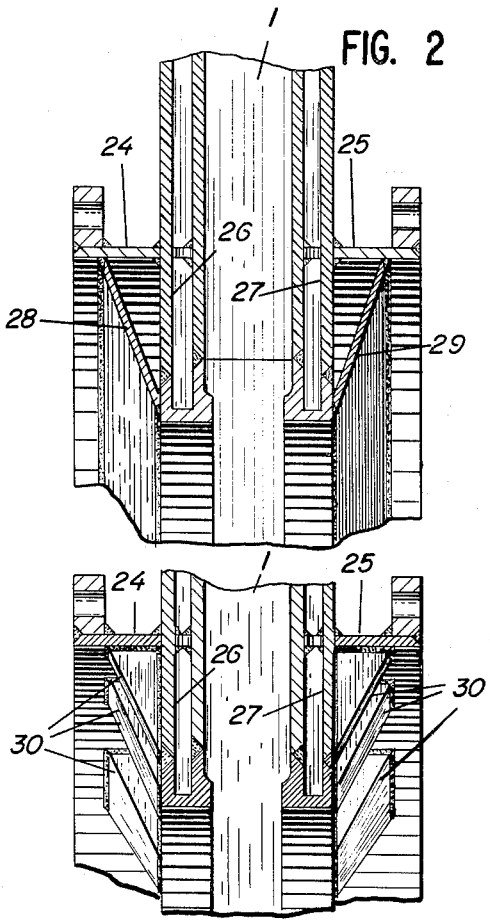
INVENTORS,
*Hermann Rappold*
*Johannes Uerlichs*
*Rudolph Müller*
by Wenderoth, Lind & Ponack
Attorneys //
United States Patent Office 3,202,171
Patented Aug. 24, 1965

3,202,171
WELDED SLIDE VALVE CASING WITH SEALING FACE SUPPORTING MEANS
Hermann Rappold, Johannes Uerlichs, and Rudolf Müller, Duren-Birkesdorf, Germany, assignors to Hermann Rappold & Co. G.m.b.H., Duren-Birkesdorf, Germany
Filed June 1, 1962, Ser. No. 199,426
Claims priority, application Germany, June 9, 1961, R 30,493
6 Claims. (Cl. 137—340)

This invention relates to a casing for a shut-off slide valve, in particular a slide valve for hot air, wherein the sealing faces of the valve casing which cooperate with the sealing faces of the slider body, are cooled by means of cooling spaces formed in the slide valve casing. The problem to be solved is essentially a more advantageous embodiment of the slide valve casing which must be of simple construction and, at the same time, of far-reaching operational safety.

A hot air slide valve is known which has an integral casing of cast steel and comprises two flangeless profiled form rings bearing the sealing faces of the casing, which rings are inserted through the air passage openings of the casing and are welded to the latter after being fitted into corresponding recesses provided in the casing, whereby the ring walls enclose the cooling spaces of the casing.

In hot air slide valves of large dimensions, cast casings suffer from considerable drawbacks, for cast iron and steel castings tend to form cracks due to the varying heat stresses to which the hot air slide valves are generally subjected, whereby such valves may become inoperative after a short period of operation. Moreover, such cast casings must be built with relatively thick walls in order to be able to satisfy at least approximately the demands that must be made on them with regard to stability, and this in turn is the cause of their unfavorably heavy weight proportions and is disadvantageous for cooling. In addition, the manufacture of cast casings with cooling spaces is made relatively difficult and correspondingly costly. Since, moreover, in such known slide valves, the casing and the sealing face-bearing form rings, which are welded thereto, and since they consist of different materials, their heat expansion factors are different, a fact which strains particularly the welded seams formed by overlapping portions of both materials. These seams do not withstand the strains, especially since they are directly exposed to the flow of hot air. Therefore such a known slide valve construction for hot air or hot gas conduits of large dimensions is not sufficiently safe in operation and therefore it has not been adopted generally in practice. It is an object of the invention to overcome the above disadvantages.

In particular, in the case of hot air slide valves which are used in high pressure furnace installations, it may happen that the pressure exerted on the slider body when the slide valve is closed, causes a yielding of the casing sealing faces which may lead to leakage in the slide valve. In order to prevent this drawback, the casing walls have been correspondingly dimensioned of a thickness which brings about a less effective cooling, thereby incurring the risk of crack formation due to uneven heat stresses.

The above-described drawbacks are obviated according to the invention by devising the slide valve casing as a welded structure which is stiffened and reinforced in the region of the sealing faces by special supporting means. In this manner, there results a slide valve casing of simple structure, light weight, and nevertheless, of a capability to withstand the highest operational stresses. Thus, the casing which is manufactured from steel sheet may be stressed even by high temperature differences without incurring the danger of crack formation. Furthermore, the casing is given the necessary resistance in the region of the sealing faces in order to withstand relatively high pressures on the slider body. This, in turn, avoids binding of the slider body, without endangering the cooling of the casing by an overdimensioned thickness of the casing walls, and the operational safety of the slide valve is thus substantially increased.

A further object of the invention is to provide supporting means which are preferably arranged between the region of the sealing faces of the casing and the end flange means of the latter, in such a manner, that the flange means serve, so to speak, as counter supports for the sealing faces. As supporting means there may be used supporting walls which are connected, on the one hand, with external plane walls, of the casing, and, on the other hand, with the flange means of the same. It is also possible to use supporting brackets, socles or the like which are also placed between the outer plane faces of the casing and the flange means. Moreover, it is possible to devise the portions of the external casing walls which lie intermediate the flange means at both ends of the valve to form themselves supporting means, namely by arranging these wall portions to lead obliquely outwardly to the flange means. This structure has the advantage of affording larger cooling spaces which permit a more advantageous arrangement of the cleaning openings for the cooling spaces.

It is preferable to strengthen the sealing faces of the casing and to provide them with profiled rings, for instance, of U-shaped cross section, the free ends of which are connected away from the flow of hot air, with the internal and outer plane walls of the casing, by butt-welded seams.

Further objects of the invention will appear from the following description and the drawing which shows several embodiments by way of example, and wherein:

FIGURE 1 is a vertical transverse cross-section through one form of casing.

FIGURE 2 is a partial sectional view showing a modification, and

FIGURE 3 is a further partial cross-sectional view illustrating a further modification.

In the drawing, the slide valve casing 1 is welded together from several individual parts which comprise two profiled rings 2 and 3 of approximately U-shaped cross-section, which have the enlarged strengthened portions 4 and 5 providing the sealing faces 6 and 7 which cooperate with the sealing faces of the slider body (not shown) when the slide valve is closed.

The profiled rings 2 and 3 are connected with the inner and outer plane walls 8, 9 and 10, 11 of the casing 1 at a distance away from the air passage opening 12 and enclose, together with these walls, cooling spaces 13 and 14 which serve for leading off heat particularly in the region of the casing sealing faces 6 and 7. The cooling medium is fed through the lower openings 15 and 16 and is discharged through the upper openings 17 and 18.

As shown in FIGURE 1, the outer U-portions 20 and 21 of the profiled rings 2 and 3 are inclined obliquely outwardly and form, in cooperation with the wall portions 22 and 23 which are fixed thereto supporting means which find their counter support in the flange portions 24 and 25 of the casing provided with the usual attaching means. Thereby support is given to the part of the slide valve casing which bears the sealing faces 6 and 7, and on which the pressure of the slider body is exerted directly when the slide valve is closed.

As shown in FIGURE 2, this support may also be achieved by providing supporting walls 28 and 29 connected, at their one end, to the plane outer walls 26 and 27 of the casing and at the other end to the flanges 24 and 25.

Furthermore, according to FIGURE 3, supporting brackets or struts 30 may be arranged at the outer walls 26 and 27, which are evenly distributed about the circumference of the casing inside the flange means 24 and 25.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

We claim:

1. A shut-off slide valve casing, in particular for a hot air slide valve comprising a casing having peripheral flange portions, sealing faces upon said casing which cooperate with the sealing faces of the slider body, said casing having cooling spaces to cool said sealing faces upon said slide valve casing, said slide valve casing having said sealing faces being welded and supporting means located adjacent said sealing faces for stiffening the same cooperating with said flange portions.

2. A shut-off slide valve casing, in particular for a hot air slide valve comprising sealing faces upon said casing which cooperate with the sealing faces of the slider body, said casing having cooling spaces to cool said sealing faces upon said slide valve casing, said slide valve casing being welded and having said sealing faces thereon spaced from one another at the interior thereof, peripheral flanges on said casing and supporting means located between said peripheral flanges and said sealing faces to stiffen said sealing faces.

3. A shut-off slide valve casing, in particular for a hot air slide valve comprising sealing faces upon said casing which cooperate with the sealing faces of the slider body, said casing having cooling spaces to cool said sealing faces upon said slide valve casing, said slide valve casing being welded and having said sealing faces thereon spaced from one another at the interior thereof, peripheral flanges on said casing and a supporting wall extending from the region of said sealing faces on said casing to said flanges to stiffen said sealing faces.

4. A shut-off slide valve casing, in particular for a hot air slide valve comprising sealing faces upon said casing which cooperate with the sealing faces of the slider body, said casing having cooling spaces formed therein, said slide valve casing being welded and having said sealing faces thereon spaced from one another at the interior thereof, peripheral flanges on said casing and supporting brackets extending from adjacent said sealing faces to said flanges to stiffen said sealing faces.

5. A shut-off slide valve casing, in particular for a hot air slide valve comprising sealing faces upon said casing which cooperate with the sealing faces of the slider body, said casing having cooling spaces formed therein, said slide valve casing being welded and having said sealing faces thereon spaced from one another at the interior thereof, peripheral flanges on said casing, said sealing faces on said casing being provided upon a ring shaped element having a U-shaped cross-section with the outer leg inclined toward said flanges to form a support for said faces.

6. A shut-off slide valve casing, in particular from a hot air slide valve comprising sealing faces upon said casing which cooperate with the sealing faces of the slider body, said casing having cooling spaces formed therein, said slide valve casing being welded and having said sealing faces thereon spaced from one another at the interior thereof, peripheral flanges on said casing, said sealing faces on said casing being provided upon a ring shaped element having a U-shaped cross-section with the outer leg inclined toward said flanges to form a support for said faces and the free ends of said U-shaped cross section being butt welded to the inner and outer plane walls of said casing spaced from the flow of hot air through said valve.

References Cited by the Examiner

UNITED STATES PATENTS

| 1,228,463 | 6/17 | Mathesius | 137—340 XR |
| 2,079,896 | 5/37 | Brosius | 251—327 XR |
| 2,165,036 | 7/39 | Eaton et al. | 251—328 |
| 2,448,706 | 9/48 | Edwards | 251—327 XR |

FOREIGN PATENTS

| 237,152 | 7/25 | Great Britain. |
| 877,077 | 5/53 | Germany. |
| 948,658 | 9/56 | Germany. |

References Cited by the Applicant

UNITED STATES PATENTS

| 3,000,608 | 9/61 | Williams. |

M. CARY NELSON, *Primary Examiner.*